United States Patent
Lin et al.

(10) Patent No.: US 11,599,519 B2
(45) Date of Patent: Mar. 7, 2023

(54) METHOD, ELECTRONIC DEVICE AND COMPUTER PROGRAM PRODUCT FOR DATA MANAGEMENT

(71) Applicant: EMC IP Holding Company LLC, Hopkinton, MA (US)

(72) Inventors: Zhenzhen Lin, Shanghai (CN); Pengfei Wu, Shanghai (CN); Si Chen, Shanghai (CN); Ruixue Zhang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 117 days.

(21) Appl. No.: 16/841,054

(22) Filed: Apr. 6, 2020

(65) Prior Publication Data
US 2021/0200739 A1    Jul. 1, 2021

(30) Foreign Application Priority Data
Dec. 31, 2019 (CN) .......................... 201911418759.0

(51) Int. Cl.
| G06F 16/22 | (2019.01) |
| G06F 21/62 | (2013.01) |
| G06F 16/182 | (2019.01) |
| G06F 16/23 | (2019.01) |
| G06F 16/17 | (2019.01) |

(52) U.S. Cl.
CPC ...... *G06F 16/2308* (2019.01); *G06F 16/1734* (2019.01); *G06F 16/182* (2019.01); *G06F 16/2255* (2019.01); *G06F 21/6218* (2013.01)

(58) Field of Classification Search
CPC ............... G06F 16/2308; G06F 16/182; G06F 16/2255; G06F 16/1734; G06F 21/6218
See application file for complete search history.

(56) References Cited

U.S. PATENT DOCUMENTS

| 6,058,400 A | * | 5/2000 | Slaughter | ................ G06F 16/10 707/999.201 |
| 6,363,396 B1 | * | 3/2002 | Klots | .................. G06F 16/9014 707/999.102 |
| 6,611,848 B1 | * | 8/2003 | Bradley | .............. G06F 16/1767 707/690 |

(Continued)

OTHER PUBLICATIONS

K. Zhang et al., "Machine Learning-Based Temperature Prediction for Runtime Thermal Management Across System Components," IEEE Transactions on Parallel and Distributed Systems, Feb. 1, 2018, pp. 405-419, vol. 29, No. 2.

(Continued)

*Primary Examiner* — Kannan Shanmugasundaram
(74) *Attorney, Agent, or Firm* — Ryan, Mason & Lewis, LLP

(57) ABSTRACT

A data management method comprises: receiving, at a first node of a plurality of nodes for collaboratively data processing, a request to perform a target operation at the first node from a second node of the plurality of nodes; obtaining a privilege of the second node from a third node of the plurality of nodes; determining a threshold privilege for performing the target operation based on a type of the target operation; and performing the target operation in accordance with a determination that the privilege of the second node is higher than the threshold privilege. In this manner, the security of data may be improved.

20 Claims, 5 Drawing Sheets

(56) References Cited

U.S. PATENT DOCUMENTS

| | | | |
|---|---|---|---|
| 7,058,696 B1* | 6/2006 | Phillips | G06F 16/95 |
| | | | 707/999.01 |
| 2004/0059734 A1* | 3/2004 | Smith | G06F 9/52 |
| | | | 707/999.009 |
| 2013/0013833 A1* | 1/2013 | Nagpal | G06F 13/14 |
| | | | 710/200 |

OTHER PUBLICATIONS

Wikipedia, "Kalman Filter," https://en.wikipedia.org/wiki/Kalman_filter, Mar. 21, 2020, 30 pages.

codeplea.com, "Interpolating in a Triangle," https://codeplea.com/triangular-interpolation, Nov. 30, 2016, 8 pages.

T.J. Chung, "Computational Fluid Dynamics," Cambridge University Press, Second Edition, Sep. 27, 2010, 21 pages.

spark.apache.org, "Clustering—RDD-Based API," http://spark.apache.org/docs/latest/mllib-clustering.html, downloaded Jun. 27, 2019, 20 pages.

S. Ahmad et al., "Unsupervised Real-Time Anomaly Detection for Streaming Data," Neurocomputing, Apr. 22, 2017, pp. 134-147.

U.S. Appl. No. 16/536,599 filed in the name of Zhenzhen Lin et al., filed Aug. 9, 2019, and entitled "Method, Device and Computer Program Product for Data Analysis."

U.S. Appl. No. 16/805,065 filed in the name of Ruixue Zhang et al., filed Feb. 28, 2020, and entitled "Methods, Devices, and Computer Program Products for Model Adaptation."

* cited by examiner ly used in various fields, for example, the Internet
METHOD, ELECTRONIC DEVICE AND COMPUTER PROGRAM PRODUCT FOR DATA MANAGEMENT

RELATED APPLICATION(S)

The present application claims priority to Chinese Patent Application No. 201911418759.0, filed Dec. 31, 2019, and entitled "Method, Electronic Device and Computer Program Product for Data Management," which is incorporated by reference herein in its entirety.

FIELD

Embodiments of the present disclosure relate to the field of computers, and more specifically to a method, an electronic device and a computer program product for data management.

BACKGROUND

In recent years, with the development of computer technologies, a decentralized multi-node architecture has been increasingly used in various fields, for example, the Internet of Things. The pressure on cloud computing and storage resources may be reduced by processing data at a plurality of nodes, e.g., an edge server, thereby improving the efficiency of the system. However, such a multi-node architecture lacks an effective privilege management mechanism, such that there is a large risk in data management, which is unexpected by people.

SUMMARY

Embodiments of the present disclosure provide a solution for data management.

According to a first aspect of the present disclosure, there is provided a method for data management. The method comprises: receiving, at a first node of a plurality of nodes for collaborative data processing, a request to perform a target operation at the first node from a second node of the plurality of nodes; obtaining a privilege of the second node from a third node of the plurality of nodes; determining, based on a type of the target operation, a threshold privilege for performing the target operation; and in accordance with a determination that the privilege of the second node is higher than the threshold privilege, performing the target operation.

According to a second aspect of the present disclosure, there is provided an electronic device. The device comprises: at least one processing unit; at least one memory coupled to the at least one processing unit and storing instructions executable by the at least one processing unit, the instructions, when executed by the at least one processing unit, causing the device to perform acts comprising: receiving, at a first node of a plurality of nodes for collaborative data processing, a request to perform a target operation at the first node from a second node of the plurality of nodes; obtaining a privilege of the second node from a third node of the plurality of nodes; determining, based on a type of the target operation, a threshold privilege for performing the target operation; and in accordance with a determination that the privilege of the second node is higher than the threshold privilege, performing the target operation.

According to a third aspect of the present disclosure, there is provided a computer program product being tangibly stored in a computer storage medium and comprising machine-executable instructions which, when executed by a device, cause the device to perform any step of the method described according to the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference sign usually refers to the same component in the example embodiments of the present disclosure.

DETAILED DESCRIPTION

Illustrative embodiments of the present disclosure will be described in more detail below with reference to the drawings. Although the drawings depict illustrative embodiments of the present disclosure, it should be appreciated that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first", "second" and so on can refer to same or different objects unless otherwise indicated.

As discussed above, a conventional decentralized multi-node processing architecture lacks a management mechanism for managing privilege of nodes. In this case, some nodes, after being attacked, might maliciously tamper with the data maintained in the nodes, which causes unexpected risks to the user.

According to embodiments of the present disclosure, there is provided a solution for data management. In this solution, when a request for performing a target operation from a second node is received at a first node of a plurality of nodes for collaborative data processing, the privilege of the second node is obtained from a third node of the plurality of nodes. Then, based on the type of the target operation, a threshold privilege corresponding to the target operation is determined. The target operation is performed when the privilege of the second node is higher than the threshold privilege. In such a manner, the embodiments of the present disclosure provide a privilege management mechanism between the plurality of nodes to prevent malicious data operations from being performed, thereby improving data security.

Figure 1:
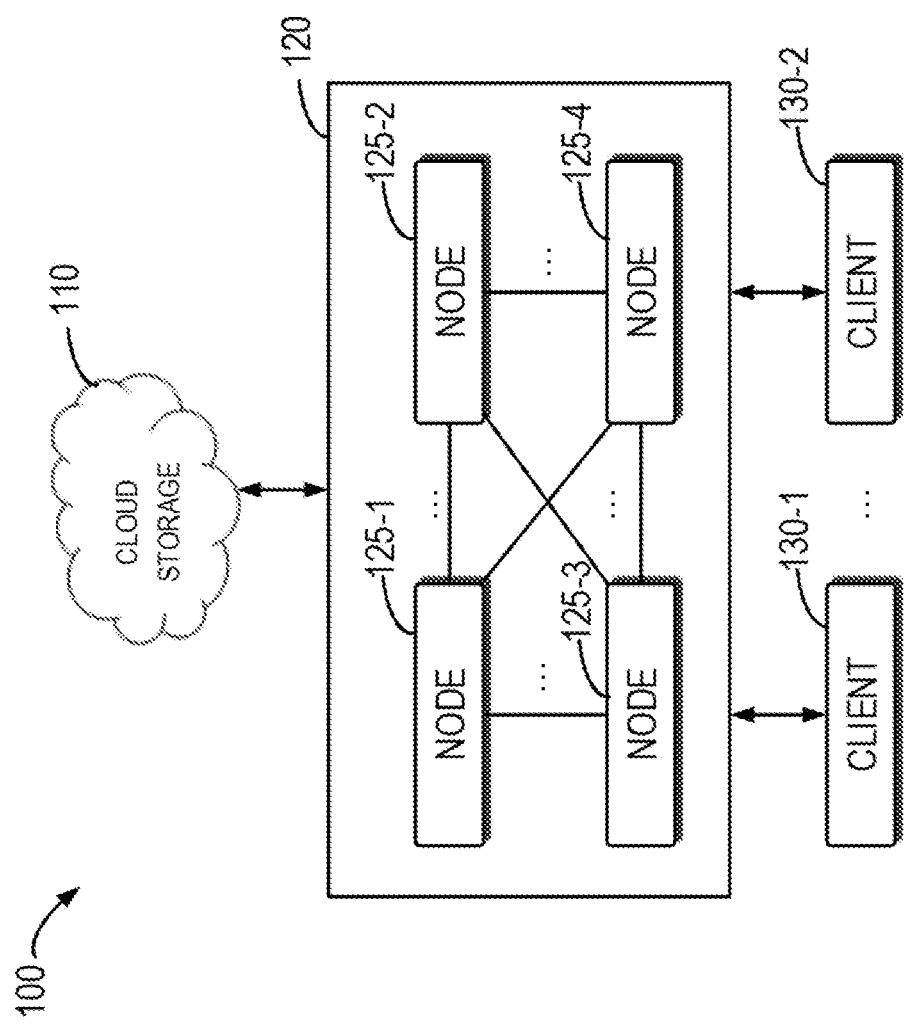
FIG. 1 illustrates a schematic diagram of an example environment in which embodiments of the present disclosure can be implemented.

Hereinafter, embodiments of the present disclosure will be described in detail with reference to the figures. FIG. 1 illustrates a schematic diagram of an example environment 100 in which embodiments of the present disclosure can be implemented. As shown in FIG. 1, the environment 100 includes a cloud storage 110, a decentralized multi-node architecture 120, and a plurality of clients 130-1 and 130-2 (hereinafter also referred to as client 130 individually or collectively). The multi-node architecture 120 includes a plurality of nodes 125-1 to 125-4 (hereinafter also referred to as the nodes 125 individually or collectively) that are communicatively coupled with each other. It should be understood that the specific number of nodes and the specific number of clients shown in FIG. 1 are only exemplary, and there may be additional or fewer nodes or clients.

The nodes 125 may receive data from clients 130 and process the data accordingly. For example, the nodes 125 may store data in the multi-node architecture 120 without uploading the data to the cloud storage 110. As another example, the nodes 125 may further analyze the received data, for example, to determine whether there is an abnormality in the data.

During such an operation, one of the plurality of nodes might need to access the data of other nodes, modify the data maintained by other nodes, or add new data to other nodes, etc. In the absence of effective management of privilege of nodes, there will be a risk in the data maintained in the multi-node architecture 120.

Figure 2:
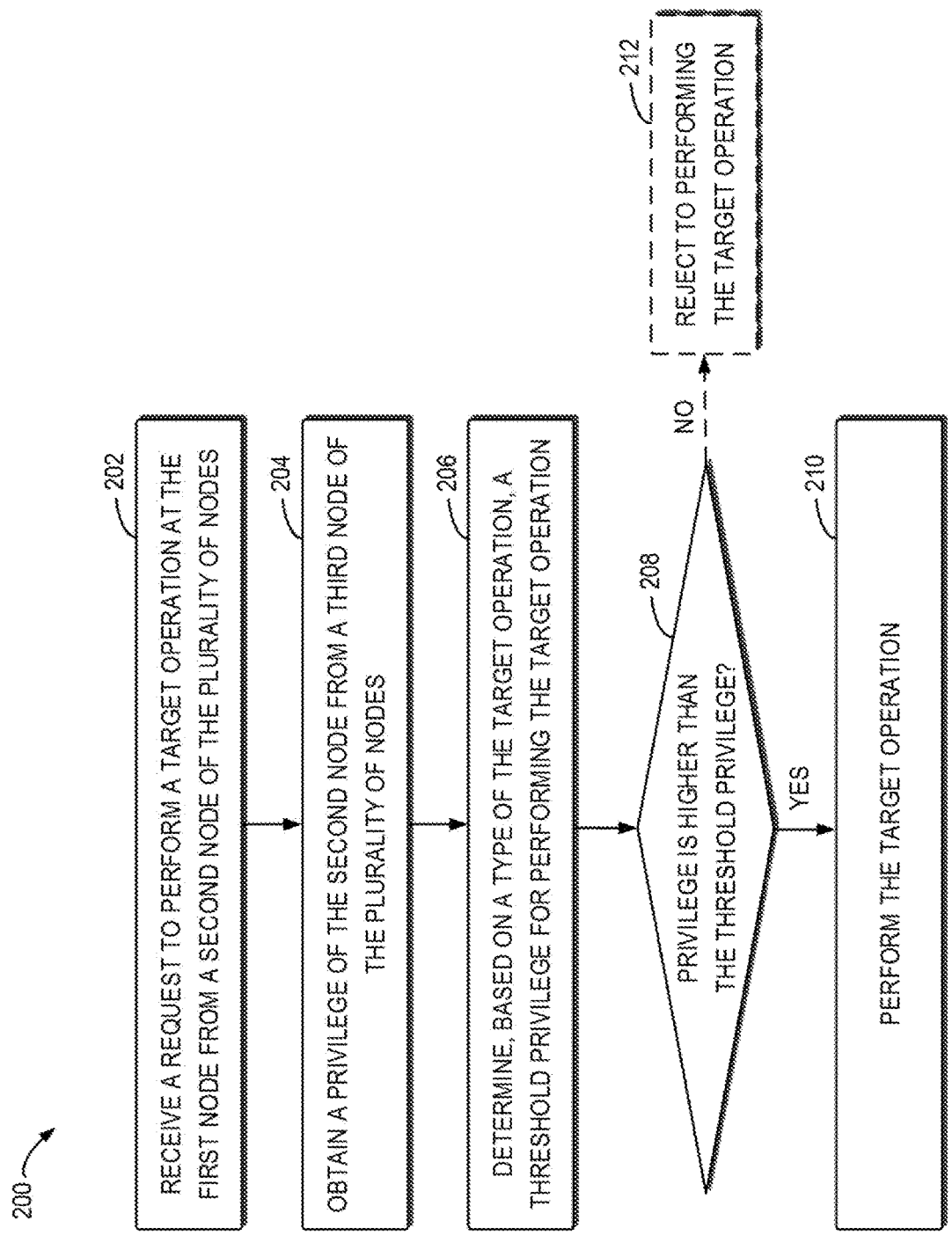
FIG. 2 illustrates a flowchart of an example process of data management according to an embodiment of the present disclosure.
Figure 3:
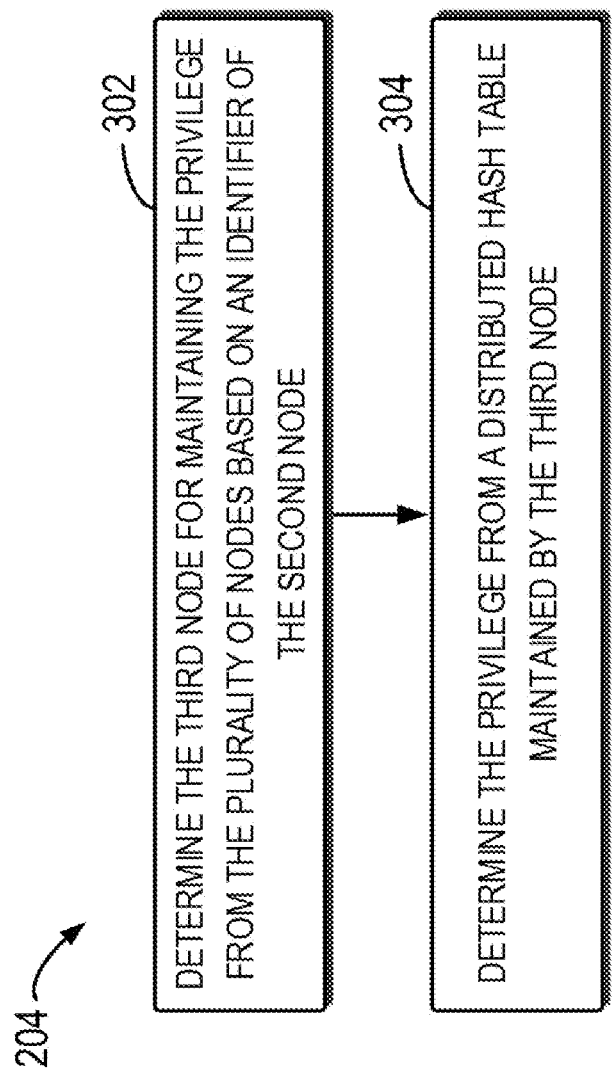
FIG. 3 illustrates a flowchart of an example process of determining privilege according to an embodiment of the present disclosure.

A process of data management according to embodiments of the present disclosure will be further described below with reference to FIG. 2 to FIG. 4. FIG. 2 illustrates a flow chart of a data management process 200 according to some embodiments of the present disclosure The process 200 for example may be implemented by the node 125-1 (hereinafter referred to as the first node for convenience of description) shown in FIG. 1.

As shown in FIG. 2, at block 202, the first node 125-1 receives, from a second node, e.g., node 125-2 in FIG. 1, in the plurality of nodes, a request to perform a target operation at the first node 125-1. For example, in the example of FIG. 1, the first node 125-1 may receive a request to perform a target operation from the second node 125-2. In some embodiments, the target operation may include reading data maintained at the first node 125-1. Alternatively or additionally, the target operation may include adding new data at the first node 125-1. Alternatively or additionally, the target operation may further include modifying data maintained at the first node 125-1. It should be understood that the target operation may also include any other suitable types of data operations.

At block 204, the first node 125-1 obtains the privilege of the second node 125-2 from a third node of the plurality of nodes, for example, the node 125-3 in FIG. 1. In some embodiments, the privilege of the plurality of nodes may be managed by maintaining a Distributed Hash Table (DHT) at the plurality of nodes.

The specific process of block 204 will be described below with reference to FIG. 3, which illustrates a flowchart of a process of obtaining privilege according to an embodiment of the present disclosure. As shown in FIG. 3, at block 302, the first node 125-1 may determine a third node 125-3 for maintaining privilege from a plurality of nodes based on an identifier of the second node 125-2. In some embodiments, the privilege of the plurality of nodes may be maintained through the distributed hash table system. FIG. 4 illustrates an example distributed hash table system 400 according to an embodiment of the present disclosure.

Figure 4:
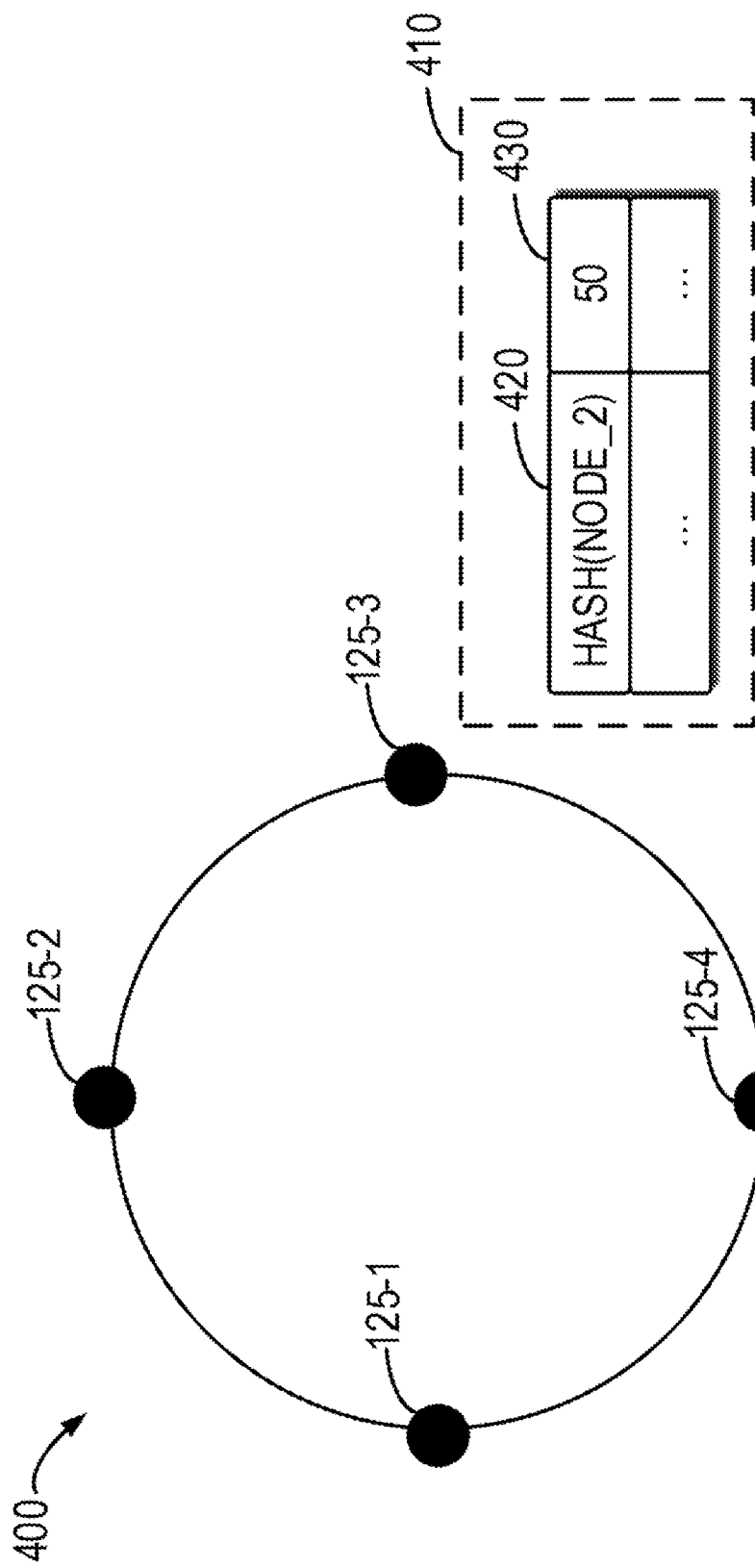
FIG. 4 illustrates an example distributed hash table system according to an embodiment of the present disclosure.

As shown in FIG. 4, in the distributed hash table system 400, metadata, e.g., a privilege, corresponding to each node, will be stored in a distributed manner in the distributed hash table maintained by the plurality of nodes based on the hash value. For example, the privilege of the second node 125-2 may be stored at the third node 125-3 based on the hash value of the identifier "NODE_2" of the second node 125-2. Due to the randomness of storage brought by the distributed hash table system, the privilege value of the node is typically not maintained locally at the node. In this manner, even if the node is attacked and becomes a malicious node, the malicious node cannot directly tamper the privilege value maintained at another node, thereby improving the reliability of the privilege management.

In some embodiments, when the first node 125-1 receives a request to perform a target operation from the second node 125-2, the first node 125-1 may first obtain the identifier, e.g., NODE_2, of the second node 125-2, and calculate a hash value of the identifier to determine the third node 125-3 maintaining the privilege of the second node 125-2 from the plurality of nodes. It should be understood that the third node may be a node that is the same as or different from the first node or the second node.

At block 304, the first node 125-1 may determine the privilege from the distributed hash table maintained by the third node 125-3. As shown in FIG. 4, the third node 125-3 maintains the distributed hash table 410 in the distributed hash table system 400. The distributed hash table 410 may include a hash value 420 (HASH (NODE_2)) corresponding to the second node 125-2 and a privilege 430 of the second node 125-2. In some embodiments, the privilege of a node may be indicated by a numerical value, for example, the value is "50" in the example of FIG. 4. Alternatively, the privilege of the node may also be indicated in other suitable forms, such as text. For example, the term "read-only" may indicate that the node can only read data from other nodes, and cannot modify data or create new data.

With continued reference to FIG. 2, at block 206, the first node 125-1 determines a threshold privilege for performing the target operation based on the type of the target operation. It should be understood that different operations may bring different risks to the data maintained at the node. For example, a data read operation usually does not cause a risk, whereas the operation of modifying the data maintained by other nodes might cause a larger risk than the operation of creating new data at other nodes. Therefore, a different threshold privilege may be set for different target operations.

In the example where the privilege is indicated by a numerical value, for example, the threshold privilege for a data read operation may be set to "0", the threshold privilege for a new data creation operation is set to "49", and the threshold privilege for a data modification operation is set to "99". In this way, the privilege to perform different operations at the nodes may be managed more flexibly.

In an example where the privilege is indicated by terms, different terms may be converted to corresponding values. For example, the term "Read-only" may correspond to a value "1", the term "New" may correspond to a value "2", and the term "Modify" may correspond to a value "3". The threshold privilege corresponding to the "read operation," "new data creation operation" and "data modification operation" may be set to "0," "1" and "2" accordingly, such that nodes with corresponding privilege can only perform the corresponding operation, and cannot perform operations that require a higher privilege.

At block 208, the first node 125-1 determines whether the privilege of the second node 125-2 is higher than the threshold privilege. In response to determining that the privilege of the second node 125-2 is higher than the threshold privilege at block 208, the method 200 proceeds to block 210, that is, the first node 125-1 performs the target operation. If not, the method 200 proceeds to block 212 where the first node 125-1 rejects to perform the target operation.

For example, for the example shown in FIG. 4, the privilege of the second node 125-2 is "50." In one example, when the second node 125-1 requests to read the data of the first node 125-1, the first node 125-1 may determine that the privilege "50" of the second node 125-2 is higher than the corresponding threshold privilege "0." Therefore, the first node 125-1 may permit a data read operation to be performed.

In another example, when the second node 125-1 requests to create new data on the first node 125-1, the first node 125-1 may determine that the privilege "50" of the second node 125-2 is higher than the corresponding threshold privilege "49", so the first node 125-1 may permit the new data creation operation of the second node 125-2.

In a further example, when the second node 125-1 requests to modify the data on the first node 125-1, the first node 125-1 may determine that the privilege "50" of the second node 125-2 is lower than the corresponding threshold privilege "99," so the first node 125-1 rejects the data modification operation of the second node 125-2. It should be understood that the specific values of the privilege and threshold privilege described above are only exemplary, and are not intended to limit the present disclosure.

In this manner, the embodiments of the present disclosure may effectively manage the privilege of the plurality of nodes, and perform personalized privilege management of the plurality of nodes according to degrees of risks of different data operations, thereby improving data security.

In some embodiments, the privilege of each node may also be dynamically updated. Specifically, when the target operation is permitted to be performed, the first node 125-1 may also cause the third node 125-3 to adjust the privilege of the second node 125-2. For example, for the example of FIG. 4, when the first node 125-1 permits the second node's request to perform a new data creation operation, the first node 125-1 may cause the third node 125-3 to update the distributed hash table maintained by it to increment the privilege 430 of the second node 125-2, for example, update it to "51". Therefore, when the second node 125-2 successfully performs a low-privilege data operation for multiple times, a higher privilege will be obtained. Accordingly, the second node 125-2 will be given a higher privilege, so that it can perform other data operations that require a higher privilege.

In some embodiments, in order to prevent malicious nodes from modifying the privilege of the nodes, a time window may also be set to avoid too frequent privilege adjustment. Specifically, the first node 125-1 may obtain a historical time moment at which the first node 125-1 allows the privilege of the second node 125-2 to be updated previously. Only when it is determined that the time difference between the historical time moment and a current time moment is greater than a predetermined time threshold, the first node 125-1 causes the third node 125-3 to update the privilege of the second node 125-2. In this way, a same node cannot repeatedly update the privilege of a certain node within a short period of time, thereby further improving the reliability of privilege management.

In some embodiments, in order to facilitate the privilege management, a management node for managing privilege may also be set in the plurality of nodes. The management node for example may set an initial privilege for each new node. For example, an initial privilege of each new node may be set to "1", that is, the new node can only read the data of other nodes. Only after successfully reading the data of other nodes multiple times in a period of time can the new node have the privilege to write data or modify the data.

In some embodiments, the management node may further perform dynamic adjustment of the privilege of the node. In some embodiments, the management node for example may detect whether the second node 125-2 is abnormal. For example, the management node may determine whether the data uploaded by the second node 125-2 is abnormal by comparing the data uploaded by the second node with data of other nodes. For example, for an Internet of Things (IoT) scenario, each node may upload temperature data. When the management node detects that there is a large difference between the temperature data uploaded by the second node and the temperature data uploaded by physically adjacent nodes, the management node may determine that the second node 125-2 is abnormal.

In some embodiments, when the management node determines that the second node 125-2 is abnormal, the management node may cause the third node 125-3 to adjust the privilege of the second node 125-2. For example, when the management node detects the abnormality of the second node 125-2, the management node may send to the third node an instruction to reduce the privilege of the second node 125-2. In some embodiments, the adjustment of the privilege may also be based on the type of abnormality. For example, the management node may determine a level of the severity of the abnormality. When the level of the severity of the abnormality is high, the management node may cause the privilege of the second node 125-2 to be reduced to a greater degree. Conversely, when the level of the severity of the abnormality is low, the management node may cause the privilege of the second node 125-2 to be reduced to a smaller degree.

For example, for an autonomous driving scenario, when the data uploaded by the second node 125-2 includes temperature data and map data uploaded by the automatically driven vehicle, the map data is more important data for the automatically driven vehicle. In one example, the management node determines that the temperature data uploaded by the second node 125-2 is abnormal and the map data is normal. At this time, the management node may, for example, adjust the previous privilege of the second node 125-2, for example, 100, which indicates a privilege to modify data, to a privilege only to create data, for example, 50. In another example, when the management node determines that the map data uploaded by the second node 125-2 is abnormal, the management node may set the previous privilege of the second node 125-2 to the only privilege, for example, 1, to read data. In this way, the management node may update the privilege of each node based on the abnormal state of the node, thereby improving the reliability of privilege management.

Figure 5:
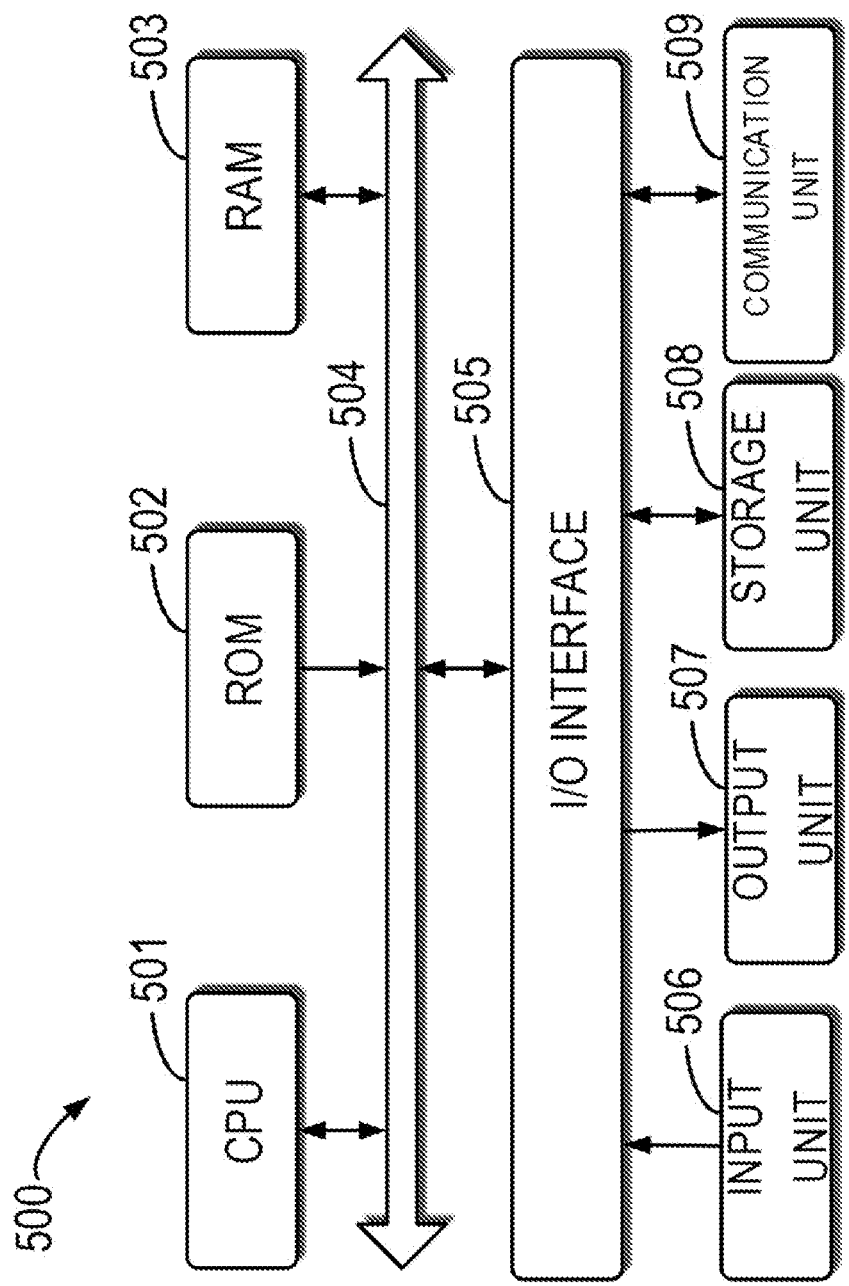
FIG. 5 illustrates a schematic block diagram of an example device that may be used to implement embodiments of the present disclosure.

FIG. 5 illustrates a schematic block diagram of an example device 500 for implementing embodiments of the present disclosure. For example, the node 125 according to embodiments of the present disclosure may be implemented by the device 500. As shown, the device 500 includes a central processing unit (CPU) 501, which can execute various suitable actions and processing based on the computer program instructions stored in a read-only memory (ROM) 502 or computer program instructions loaded in the random-access memory (RAM) 503 from a storage unit 508. The RAM 503 may also store all kinds of programs and data required by the operations of the device 500. The CPU 501, ROM 502 and RAM 503 are connected to each other via a bus 504. The input/output (I/O) interface 505 is also connected to the bus 504.

A plurality of components in the device 500 is connected to the I/O interface 505, including: an input unit 506, such as a keyboard, a mouse and the like; an output unit 507, e.g., various kinds of displays and loudspeakers etc.; a storage unit 508, such as a drive and an optical drive etc.; and a communication unit 509, such as a network card, a modem, a wireless transceiver and the like. The communication unit 509 allows the device 500 to exchange information/data with other devices via the computer network, such as Internet, and/or various telecommunication networks.

The above described process and processing, such as process 200, can be executed by the processing unit 501. For example, in some embodiments, the process 200 may be implemented as a computer software program tangibly included in the machine-readable medium, e.g., storage unit 508. In some embodiments, the computer program may be partially or fully loaded and/or mounted to the device 500 via the ROM 502 and/or communication unit 509. When the computer program is loaded to the RAM 503 and executed by the CPU 501, one or more steps of the above described process 200 can be implemented.

The present disclosure can be a method, a device, a system and/or a computer program product. The computer program product may include a computer-readable storage medium, on which the computer-readable program instructions for executing various aspects of the present disclosure are loaded.

The computer-readable storage medium may be a tangible apparatus that maintains and stores instructions utilized by the instruction executing devices. The computer-readable storage medium may be, but is not limited to, an electrical storage device, a magnetic storage device, an optical storage device, an electromagnetic storage device, a semiconductor storage device or any appropriate combinations of the above. More concrete examples of the computer-readable storage medium (non-exhaustive list) include: a portable computer drive, a hard drive, a random-access memory (RAM), a read-only memory (ROM), an erasable programmable read-only memory (EPROM or flash), a static random-access memory (SRAM), a portable compact disk read-only memory (CD-ROM), a digital versatile drive (DVD), a memory stick, a floppy drive, mechanical coding devices, a punched card stored with instructions thereon, or a projection in a slot, and any appropriate combinations of the above. The computer-readable storage medium utilized herein is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instructions herein may be downloaded from the computer-readable storage medium to each computing/processing device, or to an external computer or external storage via Internet, a local area network, a wide area network and/or a wireless network. The network may include copper-transmitted cables, optical fiber transmission, wireless transmission, routers, firewall, switches, network gate computers and/or edge servers. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure may be assembly instructions, instructions of instruction set architecture (ISA), machine instructions, machine-related instructions, microcodes, firmware instructions, state setting data, or source codes or target codes written in any combination of one or more programming languages, where the programming languages include object-oriented programming languages, such as Smalltalk, C++ and the like, and conventional procedural programming languages, e.g., "C" language or similar programming languages. The computer-readable program instructions may be implemented fully on a user's computer, partially on the user's computer, as an independent software package, partially on the user's computer and partially on a remote computer, or completely on the remote computer or a server. In the case where a remote computer is involved, the remote computer may be connected to the user's computer via any type of networks, including a local area network (LAN) and a wide area network (WAN), or to an external computer (e.g., connected via Internet using the Internet service provider). In some embodiments, state information of the computer-readable program instructions is used to customize an electronic circuit, e.g., a programmable logic circuit, a field programmable gate array (FPGA) or a programmable logic array (PLA). The electronic circuit may execute computer-readable program instructions to implement various aspects of the present disclosure.

Flowcharts and/or block diagrams of a method, a device (system) and a computer program product according to embodiments of the present disclosure describe various aspects of the present disclosure. It should be appreciated that each block of the flowcharts and/or block diagrams and the combination thereof can be implemented by computer-readable program instructions.

The computer-readable program instructions may be provided to the processing unit of a general-purpose computer, a dedicated computer or other programmable data processing devices to manufacture a machine, such that the instructions which, when executed by the processing unit of the computer or other programmable data processing devices, generate a device for implementing functions/acts stipulated in one or more blocks in the flow chart and/or block diagram. The computer-readable program instructions may also be stored in the computer-readable storage medium and cause the computer, programmable data processing device and/or other devices to work in a particular manner, such that the computer-readable medium stored with instructions includes an article of manufacture, including instructions for implementing various aspects of the functions/acts stipulated in one or more blocks of the flow chart and/or block diagram.

The computer-readable program instructions may also be loaded into the computer, other programmable data processing devices or other devices, so as to execute a series of operation steps on the computer, other programmable data processing apparatuses or other devices to generate a computer-implemented process. Therefore, the instructions executed on the computer, other programmable data processing devices or other devices implement functions/acts stipulated in one or more blocks of the flow chart and/or block diagram.

The flow chart and block diagram in the drawings illustrate system architecture, functions and operations that may be implemented by the device, method and computer program product according to the plurality of implementations of the present disclosure. In this regard, each block in the flow chart or block diagram can represent a module, a part of program segment or code, where the module and the part of program segment or code include one or more executable instructions for performing stipulated logic functions. In some alternative implementations, it should be noted that the functions indicated in the block may also take place in an order different from the one indicated in the drawings. For example, two successive blocks may be in fact executed in parallel or sometimes in a reverse order depending on the involved functions. It should also be noted that each block in the block diagram and/or flow chart and combinations of the blocks in the block diagram and/or flow chart may be implemented by a hardware-based system exclusive for executing stipulated functions or actions, or by a combination of dedicated hardware and computer instructions.

Various implementations of the present disclosure have been described above and the above description is for the purpose of illustration rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable others of ordinary skill in the art to understand implementations of the present disclosure.

What is claimed is:

1. A method for data management, comprising:
    receiving, at a first node of a plurality of nodes for collaborative data processing, a request to perform a target operation at the first node from a second node of the plurality of nodes;
    obtaining, by the first node from a third node of the plurality of nodes, a privilege of the second node maintained by the third node;
    determining, by the first node, based on a type of the target operation, a threshold privilege for performing the target operation, the threshold privilege having a first value when the target operation is a first type and a second value when the target operation is a second type; and
    in accordance with a determination by the first node that the privilege of the second node is higher than the threshold privilege, performing the target operation;
    wherein obtaining the privilege of the second node comprises:
    determining the third node for maintaining the privilege from the plurality of nodes based on an identifier of the second node; and
    determining the privilege from a distributed hash table maintained by the third node; and
    wherein the privilege is a numerical value that is dynamically updated based in part on a determination that the target operation is permitted to be performed.

2. The method according to claim 1, wherein the target operation comprises at least one of the following: reading existing data, adding new data, or modifying existing data.

3. The method according to claim 1, further comprising:
    in accordance with a determination that the target operation has been performed, causing the third node to adjust the privilege of the second node.

4. The method according to claim 3, wherein adjusting the privilege comprises:
    obtaining a historical time moment at which the first node previously caused the privilege to be updated; and
    in accordance with a determination that a time difference between the historical time moment and a current time moment is greater than a predetermined time threshold, causing the third node to update the privilege of the second node.

5. The method according to claim 1, further comprising:
    in accordance with a determination that the privilege of the second node is lower than or equal to the threshold privilege, rejecting to perform the target operation.

6. The method according to claim 1, further comprising:
    in response to determining, at a management node for managing privileges of the plurality of nodes, that an abnormality is present at the second node, causing, by the management node, the third node to adjust the privilege of the second node, the adjustment being based on a type of the abnormality.

7. The method according to claim 1, wherein the distributed hash table further comprises a hash value corresponding to the second node.

8. An electronic device, comprising:
    at least one processing unit;
    at least one memory coupled to the at least one processing unit and storing instructions executable by the at least one processing unit, the instructions, when executed by the at least one processing unit, causing the device to perform acts comprising:
    receiving, at a first node of a plurality of nodes for collaborative data processing, a request to perform a target operation at the first node from a second node of the plurality of nodes;
    obtaining, by the first node from a third node of the plurality of nodes, a privilege of the second node maintained by the third node;
    determining, by the first node, based on a type of the target operation, a threshold privilege for performing the target operation, the threshold privilege having a first value when the target operation is a first type and a second value when the target operation is a second type; and
    in accordance with a determination by the first node that the privilege of the second node is higher than the threshold privilege, performing the target operation;
    wherein obtaining the privilege of the second node comprises:
    determining the third node for maintaining the privilege from the plurality of nodes based on an identifier of the second node; and
    determining the privilege from a distributed hash table maintained by the third node; and wherein the privilege is a numerical value that is dynamically updated based in part on a determination that the target operation is permitted to be performed.

9. The device according to claim 8, wherein the target operation comprises at least one of the following: reading existing data, adding new data, or modifying existing data.

10. The device according to claim 8, the acts further comprising:
   in accordance with a determination that the target operation has been performed, causing the third node to adjust the privilege of the second node.

11. The device according to claim 10, wherein adjusting the privilege comprises:
   obtaining a historical time moment at which the first node previously caused the privilege to be updated; and
   in accordance with a determination that a time difference between the historical time moment and a current time moment is greater than a predetermined time threshold, causing the third node to update the privilege of the second node.

12. The device according to claim 8, the acts further comprising:
   in accordance with a determination that the privilege of the second node is lower than or equal to the threshold privilege, rejecting to perform the target operation.

13. The device according to claim 8, the acts further comprising:
   in response to determining, at a management node for managing privileges of the plurality of nodes, that an abnormality is present at the second node, causing, by the management node, the third node to adjust the privilege of the second node, the adjustment being based on a type of the abnormality.

14. A computer program product being tangibly stored in a non-transitory computer storage medium and comprising machine-executable instructions which, when executed by a device, cause the device to:
   receive, at a first node of a plurality of nodes for collaborative data processing, a request to perform a target operation at the first node from a second node of the plurality of nodes;
   obtain, by the first node from a third node of the plurality of nodes, a privilege of the second node maintained by the third node;
   determine, by the first node, based on a type of the target operation, a threshold privilege for performing the target operation, the threshold privilege having a first value when the target operation is a first type and a second value when the target operation is a second type; and
   in accordance with a determination by the first node that the privilege of the second node is higher than the threshold privilege, perform the target operation;
   wherein obtaining the privilege of the second node comprises:
   determining the third node for maintaining the privilege from the plurality of nodes based on an identifier of the second node; and
   determining the privilege from a distributed hash table maintained by the third node; and
   wherein the privilege is a numerical value that is dynamically updated based in part on a determination that the target operation is permitted to be performed.

15. The computer program product according to claim 14, wherein the target operation comprises at least one of the following: reading existing data, adding new data, or modifying existing data.

16. The computer program product according to claim 14, further comprising:
   in accordance with a determination that the target operation has been performed, causing the third node to adjust the privilege of the second node.

17. The computer program product according to claim 16, wherein adjusting the privilege comprises:
   obtaining a historical time moment at which the first node previously caused the privilege to be updated; and
   in accordance with a determination that a time difference between the historical time moment and a current time moment is greater than a predetermined time threshold, causing the third node to update the privilege of the second node.

18. The computer program product according to claim 14, further comprising:
   in accordance with a determination that the privilege of the second node is lower than or equal to the threshold privilege, rejecting to perform the target operation.

19. The computer program product according to claim 14, further comprising:
   in response to determining, at a management node for managing privileges of the plurality of nodes, that an abnormality is present at the second node, causing, by the management node, the third node to adjust the privilege of the second node, the adjustment being based on a type of the abnormality.

20. The computer program product according to claim 14, wherein the distributed hash table further comprises a hash value corresponding to the second node.

* * * * *